Patented July 21, 1942

2,290,567

UNITED STATES PATENT OFFICE 2,290,567

METHOD OF COAGULATING AQUEOUS DISPERSIONS OF OR CONTAINING RUBBER

James W. MacKay, Nitro, W. Va., assignor to Monsanto Chemical Company, St. Louis, Mo., a corporation of Delaware No Drawing. Application December 27, 1938, Serial No. 247,823

10 Claims. (Cl. 260—723)

My invention relates to a process of forming irreversible gels from aqueous dispersions of or containing rubber and to the application of said process to the production of porous or cellular goods or masses. More particularly, my invention relates to an improved process for the production of porous or sponge rubber products from aqueous dispersions of or containing rubber.

Numerous processes have been suggested for the production of porous or cellular rubber by which terms it is usually meant to include any porous rubber product. The present invention is directed to the production of cellular or sponge rubber products from an aqueous rubber dispersion such as latex as distinguished from products obtained by expanding crude rubber. The usual procedure for the production of sponge rubber from latex involves the formation of a foam followed by coagulation and subsequent curing and drying. This general method has been subjected to numerous modifications for carrying out the individual steps of foaming, coagulating, etc.

It is an object of my invention to provide a new method for coagulating an aqueous dispersion of rubber.

It is a further object of my invention, by the application of my new coagulating method, to simplify the production of sponge rubber by a method involving the formation, from an aqueous rubber dispersion, of a foam and subsequent coagulation of the foam. It is also an object to reduce the necessary manipulative and compounding skill to a minimum and to eliminate a maximum of variables particularly those influencing the uniformity of the final product, so that more uniform size and distribution of the pores is obtainable.

Other and further objects will be hereinafter shown.

In the production of sponge rubber it is advantageous, where possible, to employ a foam stabilizing agent to maintain the froth once obtained as well as to aid in its production. Latex itself possesses some natural frothing tendencies and the foam stabilizer may, if desired, be omitted, but without it, considerable practice and skill are required to consistently obtain a stable froth. Furthermore, the amount of agitation necessary to produce a froth is greatly increased. In operations of any magnitude these factors assume considerable importance and where possible it is of great advantage to make use of a foam stabilizing agent. Unfortunately, many of the stabilizers heretofore proposed are undesirable in the finished rubber products and frequently must be removed therefrom. In operating according to the present invention such precautions have been found unnecessary.

In carrying out the present invention I employ amine salts of fatty acids which are excellent foam stabilizing agents and which aid in the production of a froth capable of setting to an irreversible gel as hereinafter shown. These materials have no deleterious effects on the latex or the rubber products obtained therefrom but on the contrary serve, in addition to aiding the formation of a froth and stabilization thereof, other useful purposes, an example of which is their aid in the vulcanization.

As intimated above the foam stabilizer is one ingredient of my coagulating composition which obviously effects numerous advantages. Various methods and reagents for bringing about the coagulation of aqueous rubber dispersions have been proposed. However, I have discovered a new method of coagulating, which is applicable generally to aqueous rubber dispersions, and is especially useful for the coagulation of a froth produced from an aqueous dispersion of or containing rubber. My new method is founded upon the discovery that zinc oxide in the presence of an amine salt of a fatty acid brings about the setting of an aqueous rubber dispersion to an irreversible gel. A proportion of zinc oxide commonly employed for purposes of vulcanization is sufficient for my purpose. For example, desirable results have been obtained employing amounts ranging from 0.25 to 5.0% based on the rubber content but it is to be understood that other proportions may be employed where convenient or desirable. The proportion of amine fatty acid is likewise small, from 0.25-3.0% based on the rubber content usually being satisfactory, but again these limits are in nowise critical. Various metallic and non-metallic fatty acid salts have been used in latex as stabilizers or dispersing agents. Likewise amine salts of fatty acids when added to latex increase the stability thereof but according to the present invention it has now been found that upon the addition of small amounts of zinc oxide to a latex so stabilized, a remarkable coagulating rather than stabilizing effect is exerted.

In the preferred embodiment of my invention, my new method of coagulating is applied to the production of sponge rubber and more particularly to setting the froth obtained in the general method outlined above but as previously pointed out other useful functions are exhibited by the ingredients so employed. My improved process avoids many difficulties heretofore encountered. For example, it has been proposed to set a froth prepared from rubber latex by merely heating but this procedure invariably results in at least a partial breakdown of the froth which is in general highly undesirable. Considerable skill in manipulation and handling are necessary to prevent a complete breakdown. It is usually preferred to employ a chemical coagulating or gelling agent but those heretofore employed have been open to serious objection because such factors as concentration of the coagulant, time and temperature of addition, dispersion thereof, etc. must be carefully controlled with the result that the successful large scale production of sponge rubber goods has heretofore been dependent, to a considerable extent, on the manipulative skill of the workmen and it has been difficult, if not impossible, to maintain a definite standard of goods. Furthermore, while the number of compounds known to exert coagulating properties on latex is large, those applicable to a particular process, such as the production of sponge rubber, are comparatively few. Thus, the coagulant may exhibit undesirable properties in the finished rubber product, or it may seriously impair proper vulcanization. It may react adversely on the foam produced, or where a dormant coagulant is incorporated in an aqueous dispersion prior to foaming, it may prevent foaming, or render it difficult, if not impossible, to obtain a stable foam. In my new and improved process for the manufacture of sponge rubber a stable froth is produced by the use of amine salts of fatty acids as foam stabilizers and said froth is then coagulated to an irreversible gel without the use of special reagents or highly skilled methods. This is a marked simplification and improvement over former processes whereby a step heretofore necessary has been eliminated with a resultant saving of expense, time and materials. The problem of adequately dispersing the coagulant is automatically solved and maximum uniformity in the finished product is obtained since the foaming agent serves as one constituent of the coagulant. Precautions in excess of those necessary in compounding an ordinary vulcanizable latex mix are unnecessary. It is to be noted that zinc oxide is normally the last ingredient added in compounding a vulcanizable latex especially where the latex is to be foamed since it hinders the formation of a good froth and my invention adds no further encumbrance in this respect but follows the regular practice.

As a specific embodiment of my invention illustrating the coagulating influence on aqueous dispersions of rubber exerted by amine salts of fatty acids in the presence of zinc oxide but which is not limitative of the invention, a rubber latex base stock was compounded comprising

| | Parts by weight |
|---|---|
| Rubber as 60% latex | 100 |
| Zinc oxide | 2 |
| Sulfur | 2 |
| Mineral acid treated 2,2,4 trimethyl dihydroquinoline | 1 |
| Di(benzothiazyl thiol) dimethyl urea | 1 |
| Piperidine cyclopentamethylene dithiocarbamate | 0.25 |

To the base stock so compounded cyclohexylamine oleate was added in the following proportions

| | Stock | | |
|---|---|---|---|
| | A | B | C |
| Cyclohexylamine oleate | Parts by weight 0.25 | Parts by weight 0.50 | Parts by weight 1.00 |

The cyclohexylamine oleate was added to the base stock as a 10% solution after which the latex mixes were flowed on glass to form films and observations made as to the length of time required for coagulation of the film. It was found that stock A required 30–45 minutes for coagulation to take place. stock B coagulated in 5–10 minutes and stock C coagulated almost immediately.

It is shown by these results that the addition of a small amount of an amine salt of a fatty acid to a latex mix containing zinc oxide conjointly therewith brings about coagulation of the said latex mix. In addition stocks A, B and C were cured in water at 100° C. and also in air at 82° C. and found to exhibit desirable modulus and tensile properties. The function of the zinc oxide is more clearly demonstrated in the manufacture of sponge rubber where its addition is withheld until a foam is produced.

The coagulating influence of amine salts of fatty acids in conjunction with zinc oxide is admirably suited to the production of sponge rubber and as a practical embodiment of my invention showing the preferred application of my coagulating method, an amine salt of a fatty acid, as for example cyclohexylamine oleate, is added to ordinary ammonia preserved rubber latex of usual rubber content which is normally about 35%, or preferably to one of the more concentrated varieties. Other ingredients, except zinc oxide, normally employed in the vulcanization of rubber, such as sulfur and an accelerator are added and where desirable an antioxidant may be included. Other vulcanizing and compounding ingredients may be added to aid in production of various types of sponge rubber goods. For example, mineral oils tend to give very fine grain pores and are advantageously incorporated in the latex where the sponge rubber product produced therefrom is to be diverted to certain uses. The vulcanizing ingredients except zinc oxide may be added either before or during the foaming operation or even afterward where desirable. In this connection it should be noted that the foam stabilizing agent may be added to the latex after the froth is produced just as well as before, although since it aids in the ease of producing a froth, it is advantageously incorporated before. However, the present invention is applicable to the production of a wide variety of sponge rubber products from many different latex compositions and under certain unique operating conditions or for other reasons it may be desirable to withhold the addition of the foam stabilizer until the froth is produced.

The production of the froth from the latex mix is brought about by any convenient means, preferably by means of an apparatus designed for vigorous agitation in which case the procedure resembles that of whipping cream or beating an egg. If preferred the agitation may be carried out with a simultaneous and independent introduction of a stream of air or other inert gas. In some instances a froth may be produced by introducing a stream of air or other inert gas without further frothing treatment.

When the mix has been foamed to the desired consistency zinc oxide is added in the amount normally employed for proper vulcanization or if desired in somewhat larger amounts and dispersed into the foamed latex in any convenient manner preferably by continuing agitation for a short time. It is usually unnecessary to heat but if desired the setting of the foam may advantageously be hastened by warming.

The sponge rubber mass may be shaped into any form desired and vulcanization may be carried out in the usual manner. These operations entail no difficulty and the present invention does not relate thereto.

A variety of amine salts of fatty acids have been employed in my improved process and found applicable thereto. These include, in addition to cyclohexylamine oleate mentioned above, cyclohexylamine stearate, diphenyl guanidine oleate, dimethyl cyclohexylamine oleate, cyclohexylamine laurate, methyl cyclohexylamine oleate, diamyl amine oleate, hexamethylenetetramine oleate, benzylamine oleate, aniline oleate, piperidine oleate, triethanolamine oleate and amyl acetyl cyclohexylamine oleate. Obviously other typical amine salts of fatty acids such as pyridine oleate may be employed in my improved process. These materials are highly efficacious foam stabilizing agents which property they exhibit independently of other and further desirable results obtained by their use.

As a specific example of my improved process for the production of porous or cellular rubber and which will further illustrate the invention but which is not, of course, limitative thereof, a latex mix was compounded comprising.

| | Parts by weight |
|---|---|
| Rubber as 60% latex | 100 |
| Sulfur | 3 |
| Zinc mercaptobenzothiazole | 1 |
| Piperidine cyclopentamethylene dithiocarbamate | 0.25 |
| Cyclohexylamine oleate | 0.7 |

The latex mix so compounded was whipped into a froth by means of a Hobart mixer employing a basket type whip and 3 parts by weight of zinc oxide was added during continuous agitation which was continued for a short time after the addition. The spongy mass was then poured into molds where coagulation took place in a short time and the product was cured at 90–100° C. in water and subsequently dried at room or slightly elevated temperatures.

An examination of the finished product revealed that the pores were relatively uniform in size and distribution.

My invention is not limited to the particular order of steps described in the above specific example. Thus, as stated above, the foam stabilizing agent may be added to the latex after the froth has been prepared. Likewise, other and further ingredients may be added at various stages in the process, the exact procedure, of course, being dependent upon the particular mix employed and upon other factors influencing the manufacture. Obviously other ratios of the compounding ingredients than those mentioned, as well as other well known fillers, pigments and the like may be employed in the production of various types of rubber compounds and are apparent to those skilled in the art to which the invention pertains. My invention is limited solely by the following claims:

What is claimed is:

1. The process of making cellular rubber which comprises adding to an aqueous dispersion of rubber an amine salt of a fatty acid, forming said dispersion into a froth, adding zinc oxide and coagulating the froth to an irreversible gel solely by the action of the zinc oxide in conjunction with the amine salt.

2. The process of making cellular rubber which comprises coagulating a froth of an aqueous dispersion of rubber by the action of an amine salt of a fatty acid in conjunction with an amount of zinc oxide necessary for proper vulcanization.

3. The process of making cellular rubber which comprises adding to an aqueous dispersion of rubber an amine salt of a fatty acid, forming said dispersion into a froth adding zinc oxide and coagulating said froth to an irreversible gel by the action of the zinc oxide in conjunction with the amine salt of the fatty acid, said rubber dispersion having other vulcanizing ingredients added thereto either before or after being formed into a froth.

4. The process of making cellular rubber which comprises adding vulcanizing ingredients, except zinc oxide, and including an amine salt of a fatty acid, to rubber latex, agitating the latex mix into a froth, adding zinc oxide in amounts normally employed for vulcanization and coagulating said froth by the action of the zinc oxide in conjunction with the amine salt of the fatty acid.

5. The process of making cellular rubber which comprises adding to rubber latex an amine salt of a fatty acid, agitating the latex into a froth, adding zinc oxide, coagulating the froth by the action of the amine salt of the fatty acid in conjunction with the zinc oxide, vulcanizing and drying, said latex having other necessary vulcanizing ingredients added thereto either before or after being agitated into a froth.

6. The process of making cellular rubber which comprises adding a cyclohexylamine salt of a fatty acid to rubber latex, agitating the latex into a froth, adding zinc oxide and coagulating the froth by the action of the cyclohexylamine salt in conjunction with the zinc oxide.

7. The process of making cellular rubber which comprises adding zinc oxide to a froth of rubber latex containing a cyclohexylamine salt of a fatty acid, sulfur and an accelerator and setting said froth into an irreversible gel solely by the action of the zinc oxide in conjunction with the cyclohexylamine salt.

8. The process of making cellular rubber which comprises adding a small amount of cyclohexylamine oleate to rubber latex, agitating the latex into a froth, adding zinc oxide in an amount sufficient for proper vulcanization and setting the froth solely by the action of the zinc oxide in conjunction with the cyclohexylamine oleate.

9. The process of making cellular rubber which comprises adding a small amount of benzylamine oleate to rubber latex, agitating the latex into a froth, adding zinc oxide in an amount sufficient for proper vulcanization and setting the froth solely by the action of the zinc oxide in conjunction with the benzylamine oleate.

10. The process of making cellular rubber which comprises adding a small amount of diphenyl guanidine oleate to rubber latex, agitating the latex into a froth, adding zinc oxide in an amount sufficient for proper vulcanization and setting the froth solely by the action of the zinc oxide in conjunction with the diphenyl guanidine oleate.

JAMES W. MACKAY.